United States Patent Office 3,321,953
Patented May 30, 1967

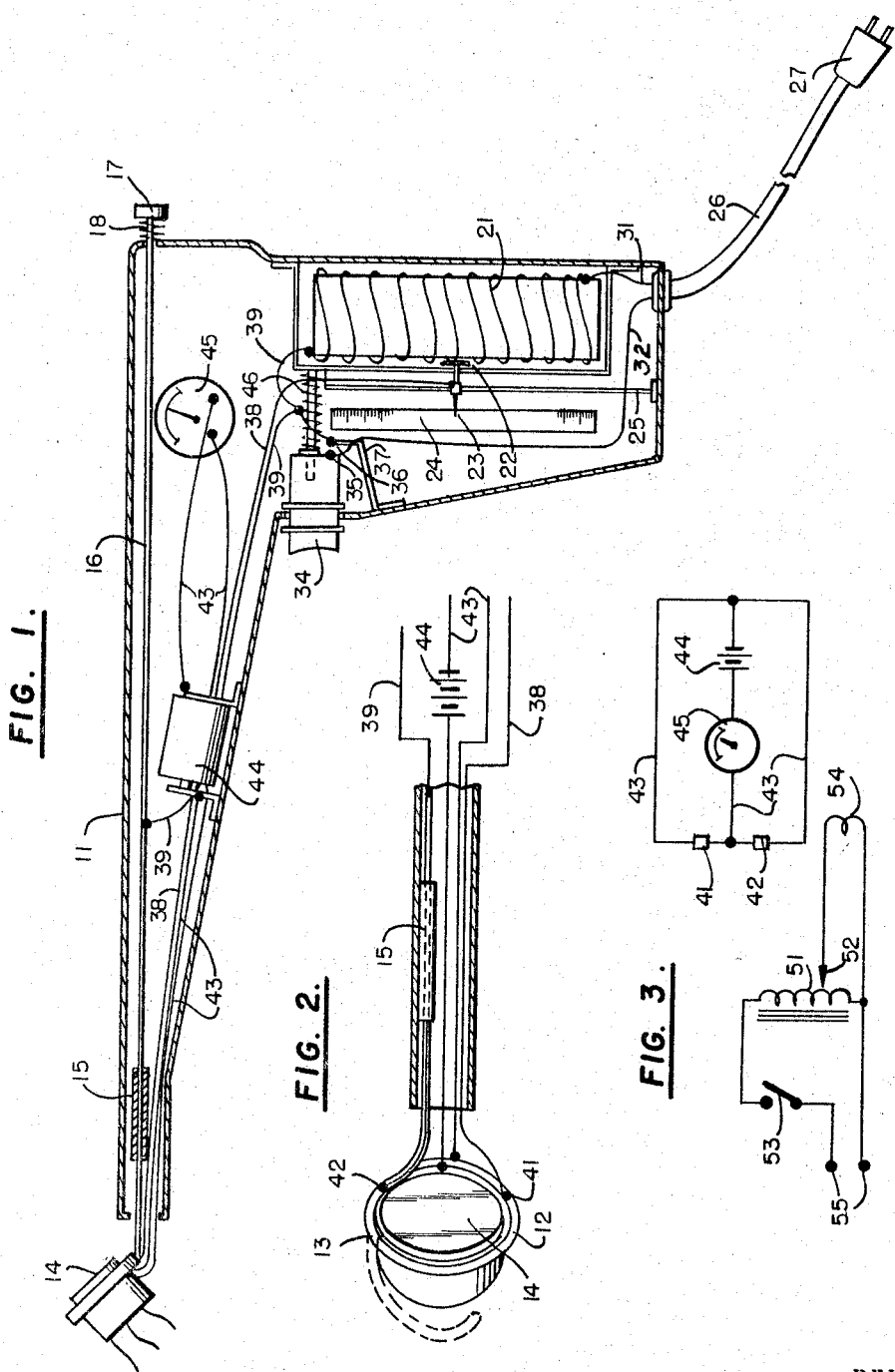

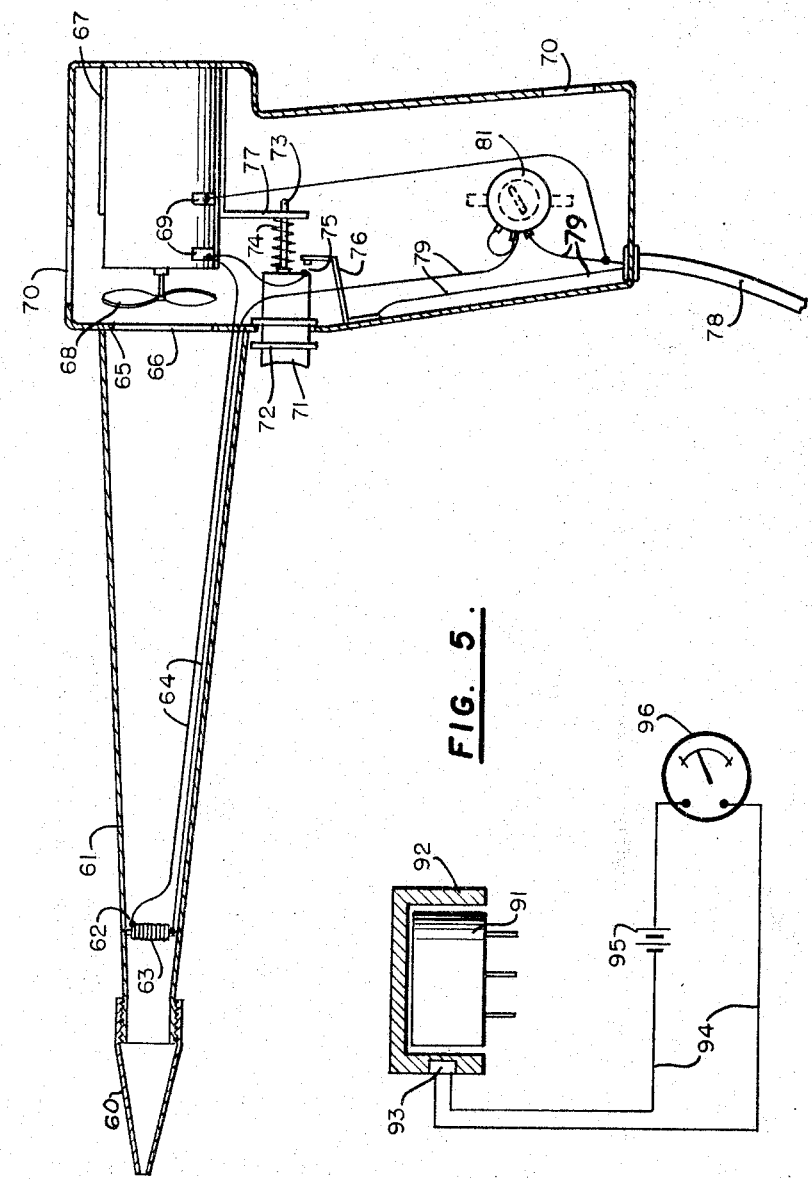

3,321,953
APPARATUS FOR THERMAL TESTING
TRANSISTORS IN SITU
Denes Roveti, Washington, D.C., assignor of one-third to William Grobman, Washington, D.C.
Filed Apr. 30, 1963, Ser. No. 276,897
2 Claims. (Cl. 73—15)

This invention relates to test instruments, and more particularly, to instruments for testing in situ the operating characteristics of transistors.

Since the introduction of the transistor several years ago, it has become one of the most popular electronic components. The success of the transistor is due to many things. Transistors do not require sources of electrical energy for thermionic filaments, they are small, they are rugged and can withstand mechanical shock, and they require small power supplies. However, with their advantages, transistors, and particularly those made of germanium, have one serious disadvantage. Germanium semiconductors are extremely temperature sensitive. This sensitivity takes two forms: (1) as the temperature of a germanium transistor rises, its leakage current also rises exponentially, increasing the amount of feedback and adversely affecting the gain, and (2) as the temperature of a transistor rises, the tendency for the contaminants at the rectifying junction to diffuse from the barrier layer into the body of the germanium increases. Although the increased diffusion of the contaminants does shorten the life of the transistor, that effect of higher temperatures is not as important to everyday operation of a device incorporating transistors as is the change in the leakage current. This is particularly true since the change in the leakage current is exponential, and for every 9 or 10 degrees centigrade increase in the temperature of the transistor, the leakage current doubles.

So far, only the average or normal transistor has been described. However, even with careful quality control, substandard transistors which are more than normally temperature sensitive find their way into important circuits. The presence of such transistors can introduce many disturbing effects into what would ordinarily be a stable circuit. In the past, it has been extremely difficult to test transistors in situ. And transistors, unlike discharge tubes, are often soldered permanently into the circuit and are not readily removed for testing.

It is an object of this invention to provide a new and improved test instrument.

It is another object of this invention to provide a new and improved test instrument for testing transistors in situ.

It is a further object of this invention to provide a new and improved instrument for testing the temperature characteristics of transistors.

It is yet a further object of this invention to provide new and improved instruments for testing transistors for temperature characteristics simply and effectively.

Other advantages and objects of this invention will become more apparent as the following description proceeds, which description should be considered together with the accompanying drawings in which:

FIG. 1 is a sectional view of one form of instrument according to this invention;

FIG. 2 is a plan view of the muzzle portion of the instrument of FIG. 1;

FIG. 3 is a circuit diagram of the electrical system of the device of FIG. 1;

FIG. 4 is a sectional view of a modification of the test instrument of FIG. 1; and FIG. 5 is a circuit diagram of a temperature measuring device to be used with the device of FIG. 3.

Referring now to the drawings in detail, and to FIGS. 1 and 2 in particular, the reference character 11 designates a generally pistol-shaped housing supporting at the muzzle end a fixed hook-shaped member 12 and a movable hook-shaped member 13 surrounding a transistor 14. The movable member 13 is slidably supported in a sleeve 15 affixed to the housing 11 and is connected to one end of a rod 16 having a push button 17 on its other end. A spring 18 tends to bias the movable member 13 into its closed position. A transformer 21 is supported in the grip portion of the housing 11. The transformer 21 is of the adjustable type having a slide contact 22 mounted on a side rod 25 and carrying a pointer 23 at its other end. The pointer 23 cooperates with a rigidly mounted scale 24 in a manner indicated hereinafter. Electrical energy is supplied to the transformer 21 by a cable 26 adapted to be connected to any suitable source of energy as by plug 27. One wire 31 of the cable 26 is connected to one side of the transformer 21, and the other wire 32 of the cable 26 is connected to one contact 35 mounted on a manually operable trigger 34. The other contact 36 of the switch is supported by bracket 37 and is connected to another input to the transformer 21. The slide contact of the transformer 21 is connected to the stationary member 12, and the slidable member 13 is also connected to the other side of the transformer 21. A spring 46 maintains the trigger 34 in its extended position. A pair of thermocouples or thermistors 41 and 42 (see FIG. 2) are attached to the members 12 and 13. Wires 43 connect the individual thermistors in series with a source of electrical energy such as a battery 44 and a meter 45.

The circuitry of the device of FIG. 1 is better shown schematically in FIG. 3 in which a pair of terminals 55 are provided for connection to a source of electrical energy. A switch 53 is the equivalent of the push button switch 34 and serves to close the circuit to the autotransformer 51. A slide contact 52 is movably adjustable to vary the turns ratio between the primary and the secondary of the transformer 51. A single turn 54, connected across what is the secondary of the transformer 51, essentially short-circuits the secondary and embraces the transistor to be tested. The thermistors 41 and 42 are shown connected in parallel across with each other and in series with the battery 44 and the meter 45 by wires 43.

In operation, the push button 17 is depressed to force the member 13 into the open position as shown by the dashed lines in FIG. 2. The opening between the two members 12 and 13 is then slipped over the transistor 14 being tested and the push button 17 is released. Under the action of the spring 18, the member 13 is returned to its closed position, firmly gripping the transistor 14 between the two members 12 and 13. The member 13 is mounted on the push rod 16 which slides in the sleeve 15 mounted on the housing 11. As can be seen from a consideration of the circuit of FIG. 3, the two members 12 and 13 form a loop about the transistor 14, and the loop is connected at one end through the wire 39 to one end of the transformer 21 and at the other end by wire 38 to the slide 22 of the transformer 21. The slide 22 is positioned along the transformer 21 until the pointer 23 indicates a suitable temperature value on the scale 24. The housing 11 should be either broken away so that the scale 24 is readily seen or have a transparent portion for the same purpose. In addition, means is provided for manually adjusting the slide 22 and the pointer 23. The scale 24 may be calibrated in temperature to indicate the appoximate temperature to obtain the transistor 14 is to be raised. This, in effect, adjusts the turns ratio of the transformer and determines the amount of current which will flow through the members 12 and 13. The push button 34 is then depressed until the contacts 35 and 36 are closed to energize the transformer 21. Current flows through the members 12 and 13 heating them. Of course, the members 12 and 13 may be indirectly heated by imbedded heating elements, if desired. As the members 12 and 13 and the transistor 14 heat, the current flowing through the thermistors 41 and 42 changes, and these changes are shown on the meter 45. When the temperature of the system including the transistor 14 has stabilized, as shown by no further changes in the reading of the meter 45, the transistor 14 and the circuit in which it is connected is tested for operation by injecting a signal (shaped pulse or otherwise) into the input of the system containing transistor 14, and observing the size and shape of the signal at the output of the system. The effects of temperature can thereby be seen.

Since it is important to determine the operating characteristics of a transistor and the circuit in which it is contained over a range of temperatures, the slide 22 can be moved and the temperature of the transistor 14 varied accordingly. The meter 45 may be accurately calibrated with the thermistors 41 and 42 to indicate the actual temperature of the transistor 14, and it may be used to indicate at what temperature and what temperature differences significant changes in the operation of the circuit of the transistor 14 take place. Thus, in a system in which the operating characteristics change with the room temperature to produce drift, changes in gain, or the like, the offending transistor may readily be determined by using the instrument as indicated above.

A cap of suitable material may be substituted for the members 12 and 13. The heating element, thermistors, connecting wires, and the like may be incorporated in the cap which fits over the transistor 14 in use.

A slightly modified embodiment of the invention is shown in FIG. 4 in which a pistol-shaped housing 61 of suitable material and having a replaceable conical muzzle 60, carries in its muzzle end an electrically non-conducting heat-resistant support 62 about which is wrapped a suitable heating element 63. The support 62 may be a ceramic cylinder, for example. A partition 65 having an opening 66 divides the housing into two parts. Behind the partition 66 is a fan comprising a small electric motor 67 driving a fan blade 68. Suitable perforations 70 in the wall of the housing 61 provide means for air to enter the interior. The motor 67 carries a pair of electric terminals 69 to which energizing wires are connected. The motor 67 is supported in the housing 61 by any suitable means such as by a bracket 77 attached to the side of the housing 61 by rivets, screws, or the like. A push-button 71 having a flange 72 is supported in an opening in the housing 61 and is biased to its outward position by a spring 74 surrounding a supporting rod 73. The button 71 carries a contact 75 which is adapted to mate with a second contact 76 supported within the housing 61. Electrical energy is supplied to the device by a cable 78 which contains a pair of wires 79. One of the wires 79 is connected to the contact 76, and the other is connected to one end of a potentiometer 81 and to one of the motor terminals 69. The slide of the potentiometer 81 (not shown separately) is connected to the other end of the potentiometer 81 which is also connected to one side of the heating element 63. The other contact 75 is connected to the other motor terminal 69 and to the other side of the heating element 63.

In operation, depression of the push-button 71 as far as the flange 72 will permit, and against the action of the spring 74, closes the circuit by engaging the two contacts 75 and 76. Current, supplied through the cable 78, then flows to the motor 67, and through the potentiometer 81 to the heating element 63. As the motor turns, the fan blade 68 forces air through the opening 66 in the partition 65 and over the heating element 63. Thus, heated air is driven out of the open muzzle end of the housing 61. Fresh air is drawn through the perforations 70 in the wall of the housing 61. If the motor 67 has a tendency to heat in the housing, then only the perforations 70 below the motor 67 may be left open so that the cool air entering the housing 61 passes over the motor 67 to cool it. The amount of current received by the heating element 63 is determined by the setting of the potentiometer 81 and the amount of resistance which is thereby inserted in the circuit. If desired, the potentiometer 81 may also carry a pointer which cooperates with a scale (not shown) calibrated in temperature units. The muzzle end of the housing 61 is then pointed at a particular transistor to be tested, and the transistor is thereby heated by the hot air being expelled from the housing 61.

In order to ensure that the transistor has reached a steady temperature and to provide an indication of what that temperature is, the device shown in FIG. 5 may be used with the instrument of FIG. 4. A heat sink 92 of metal or other suitable material is shaped to fit over the transistor 91 being tested. A thermocouple or thermistor 93 is attached to the heat sink 92 and is heated therewith. A pair of wires 94 connect the thermistor 93 in series with a source of electrical energy such as battery 95 and a meter 96. The meter 96 may be calibrated with the thermistor 93 to indicate temperature accurately.

The heat sink 92 is applied over the transistor 91 to be tested, and the instrument of FIG. 4 is aimed at the transistor to raise its temperature. As the temperature of the transistor 91 and the heat sink 92 rises, the reading of the meter 96 will change. The circuit of the transistor 91 can be checked as indicated above as soon as the temperature reaches a stable point. In addition, the temperature of the transistor 91 can be varied by changing the setting of the potentiometer 81 to apply more or less heat. Since the unit of FIGS. 4 and 5 operates by using air as the heat exchange medium, it can change the temperatures of the transistor 91 quite rapidly, even with the use of the heat sink 92. In addition, since there need be no direct contact between the device of FIG. 4 and the transistor 91 itself, this embodiment is useful in close quarters and where there is the danger of electrical shocks.

In addition, the device of FIG. 4 is useful for applying heated air of a controlled temperature wherever needed. For example, this device may be used to apply heat to heat-shrinkable tubing used to insulate wires, shrinkable heat sinks on transistors, and the like.

This specification has described new and improved test instruments particularly designed for the testing of transistors connected into circuits without removing them from their circuits. Since it is recognized that the above descriptions will undoubtedly indicate to those skilled in the art other ways in which the principles of this invention may be used without departing from the spirit thereof, it is intended that this invention be limited by the scope of the appended claims only.

What is claimed is:

1. An instrument for testing the heat characteristics of transistors while connected into a circuit, said instrument comprising a generally pistol-shaped housing having a handle portion and a muzzle portion, a calibrated electrical current regulating means mounted in said handle portion, means for connecting one side of said regulating means to a source of electrical energy, means for converting electrical energy into heat, means for connecting said conversion means to the other side of said regulating means so that said regulating means controls the amount of current flowing through said conversion means, means for modifying the geometrical configuration of said conversion means to cause it to fit snugly about the casing of a transistor, temperature measuring means for determining the temperature to which said transistor is raised by said conversion means, said regulating means comprising a variable transformer having a primary and a secondary manual adjustment means connected to change the ratio of turns between said secondary and said primary, and switching means for controlling the electrical energization of said primary, said heat conversion means comprising a single loop composed at least partially of electrical resistance material, said loop being split to form two separate portions, hinge means connecting said two portions so that one of said portions can swing out with respect to the other, and manually controlled means for causing one portion to swing with respect to the other.

2. The instrument defined in claim 1 further including resilient means mounted to bias said two portions to the closed position.

References Cited
UNITED STATES PATENTS

| 2,854,844 | 10/1958 | Howell | 73—1 |
| 3,067,604 | 12/1962 | Brunson | 73—1 |

RICHARD C. QUEISSER, *Primary Examiner.*

J. C. GOLDSTEIN, *Assistant Examiner.*